United States Patent
Diachina et al.

(10) Patent No.: US 9,015,319 B2
(45) Date of Patent: Apr. 21, 2015

(54) LAYERED ACCESS CONTROL FOR MACHINE TYPE COMMUNICATION DEVICES

(75) Inventors: John Diachina, Garner, NC (US); Paul Schliwa-Bertling, Ljungsbro (SE); Andreas Bergström, Vikingstad (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 824 days.

(21) Appl. No.: 13/051,361

(22) Filed: Mar. 18, 2011

(65) Prior Publication Data

US 2011/0302310 A1   Dec. 8, 2011

Related U.S. Application Data

(60) Provisional application No. 61/351,468, filed on Jun. 4, 2010, provisional application No. 61/353,308, filed on Jun. 10, 2010.

(51) Int. Cl.
| | |
|---|---|
| *G06F 15/173* | (2006.01) |
| *H04W 12/08* | (2009.01) |
| *H04L 29/06* | (2006.01) |
| *H04W 4/00* | (2009.01) |
| *H04L 29/08* | (2006.01) |

(52) U.S. Cl.
CPC .......... *H04W 12/08* (2013.01); *H04L 63/0263* (2013.01); *H04W 4/005* (2013.01); *H04L 67/04* (2013.01)

(58) Field of Classification Search
USPC .................. 709/224, 225, 228, 229; 455/515
See application file for complete search history.

(56) References Cited

U.S. PATENT DOCUMENTS

| 8,155,684 | B2* | 4/2012 | Agulnik et al. ............... 455/515 |
|---|---|---|---|
| 2006/0084432 | A1* | 4/2006 | Balasubramanian et al. 455/434 |
| 2007/0237093 | A1* | 10/2007 | Rajagopalan et al. ........ 370/254 |
| 2008/0200146 | A1* | 8/2008 | Wang et al. .................... 455/410 |
| 2010/0057485 | A1* | 3/2010 | Luft ................................. 705/1 |
| 2010/0197294 | A1* | 8/2010 | Fox et al. ................... 455/422.1 |
| 2011/0173679 | A1* | 7/2011 | Perumal et al. .................... 726/4 |
| 2011/0270984 | A1* | 11/2011 | Park .............................. 709/225 |

FOREIGN PATENT DOCUMENTS

| WO | WO 99/44379 A1 | 9/1999 |
|---|---|---|
| WO | WO 9944379 A1 * | 9/1999 |
| WO | WO 2006/093557 A2 | 9/2006 |

* cited by examiner

*Primary Examiner* — Joon H Hwang
*Assistant Examiner* — Cheikh Ndiaye

(57) ABSTRACT

A layered approach to access control is used where each access control layer implements a set of access control rules. The access control rules in each layer are applied in order beginning with the first access control layer. To gain access to the network, the access attempt must not be barred by any access control layer.

20 Claims, 6 Drawing Sheets

LAYERED ACCESS CONTROL FOR MACHINE TYPE COMMUNICATION DEVICES

RELATED APPLICATIONS

This application claims the benefit of U.S. Provisional Patent Application Ser. No. 61/351,468 filed on Jun. 4, 2010 and Ser. No. 61/353,308 filed Jun. 10, 2010.

BACKGROUND

The present invention relates generally to access control in mobile communication networks and, more particularly, to access control for wireless terminals or machine-type communication (MTC) devices.

The random access channel (RACH) in mobile communication networks provides contention-based access to wireless terminals to request connection setup when no traffic channel has been allocated to the wireless terminal. In systems based on the GSM/EDGE standard, the wireless terminal sends an access request message to the network on the RACH. The access request message includes a randomly generated reference value—such as the Reference Request information—for identification purposes, in lieu of an identifier such as the IMSI, for reasons of security and minimizing the amount of information sent by a wireless terminal to accomplish contention resolution. The wireless terminal then monitors the Access Grant Channel (AGCH) for a response. The network may either accept or deny the access request. If it accepts it, the network transmits an Immediate Assignment (IA) message on the AGCH, identifying the wireless terminal by the random reference value included in the access request message and directing it to a traffic channel. If the network denies access to the requesting wireless terminal, it transmits an Immediate Assignment Reject (IAR) message.

Contention occurs on the RACH occur when two or more wireless terminals attempt to access the communication network at the same time. In the event of a contention, the network will resolve the contention in favor of one of the wireless terminals. The unsuccessful wireless terminals will then "back-off" and make a new access attempt at a later time. As the number wireless terminals increases, there is a greater probability of contention between the wireless terminals and a greater number of access attempts will fail. If too many contentions occur, throughput on the RACH will be significantly reduced.

The anticipated introduction of a large volume of machine-type communication (MTC) devices in the near future will greatly increase the problem of congestion on the RACH. MTC devices are devices, such as a meter or sensor, that collect and send data to an MTC server or other MTC device over a communication network. It is expected that MTC devices will far outnumber non-MTC devices, such as user terminals for voice and data communications by human users. Therefore, there is a need to implement new procedures to control network access by MTC devices and minimize the impact on non-MTC devices.

SUMMARY

Embodiments of the present invention provide methods and apparatus for controlling network access on a contention-based RACH by MTC devices. More particularly, a layered approach to access control is used where each access control layer implements a set of access control rules based on different attributes. The access control rules in each layer are applied in order beginning with the first access control layer. That is, the access control rules for access control layer 1 are applied first, followed by the access control rules for access control layer 2, and so forth. To gain access to the network 100, the access attempt must not be barred by any access control layer.

Exemplary embodiments of the invention comprise methods of access control implemented by a base station. In one exemplary embodiment, the method comprises selectively enabling one or more access control layers based on an application type for each one of a plurality of application types, where each access control layer comprises a set of access control rules; and signaling the enabled access control layers for each application type to access terminals associated with said applications.

Other embodiments comprise a base station implementing a layered access control scheme. In one embodiment, the base station comprises a transceiver for communicating with one or more access terminals and a control unit connected to the transceiver for controlling access to the communication network by an application. The control unit includes a processor configured to selectively enable one or more access control layers based on an application type for each one of a plurality of application types, where each access control layer comprising a set of access control rules; and transmit information specific to the enabled access control layers for each application type to access terminals hosting applications accessing the communication network.

Other embodiments comprise an access control method implemented by an MTC device. In one exemplary embodiment, the method comprises determining an application type for an application that is attempting to access said communication network; determining one or more access control layers from a set of two or more access control layers enabled for the application type, where each layer contains one or more sets of access control rules; and applying access control rules for the enabled access control layers to control access to the network by the application.

Other embodiments comprise an MTC device implementing a layered access control scheme. In one embodiment, the MTC device comprises a transceiver for communicating with a base station in a communication network and a control unit connected to the transceiver for controlling access to the a communication network by an application attempting to access the communication network. The control unit includes a processor configured to determine an application type for the application; determine one or more access control layers from a set of two or more layers enabled for the application type; and apply access control rules for the enabled access control layers to control access to the network by the application.

With the multi-layered access control scheme, network operators are provided with the ability to bar system access by MTC applications with fine granularity. The layered access control scheme also provides the network operator with the ability to determine what types of network accesses are barred at any point in time and the period for which the barring is to be applied. Barring may be applied separately to user plane and control plane applications. The following is a more detailed description of one exemplary access control scheme.

DETAILED DESCRIPTION

Figure 1:
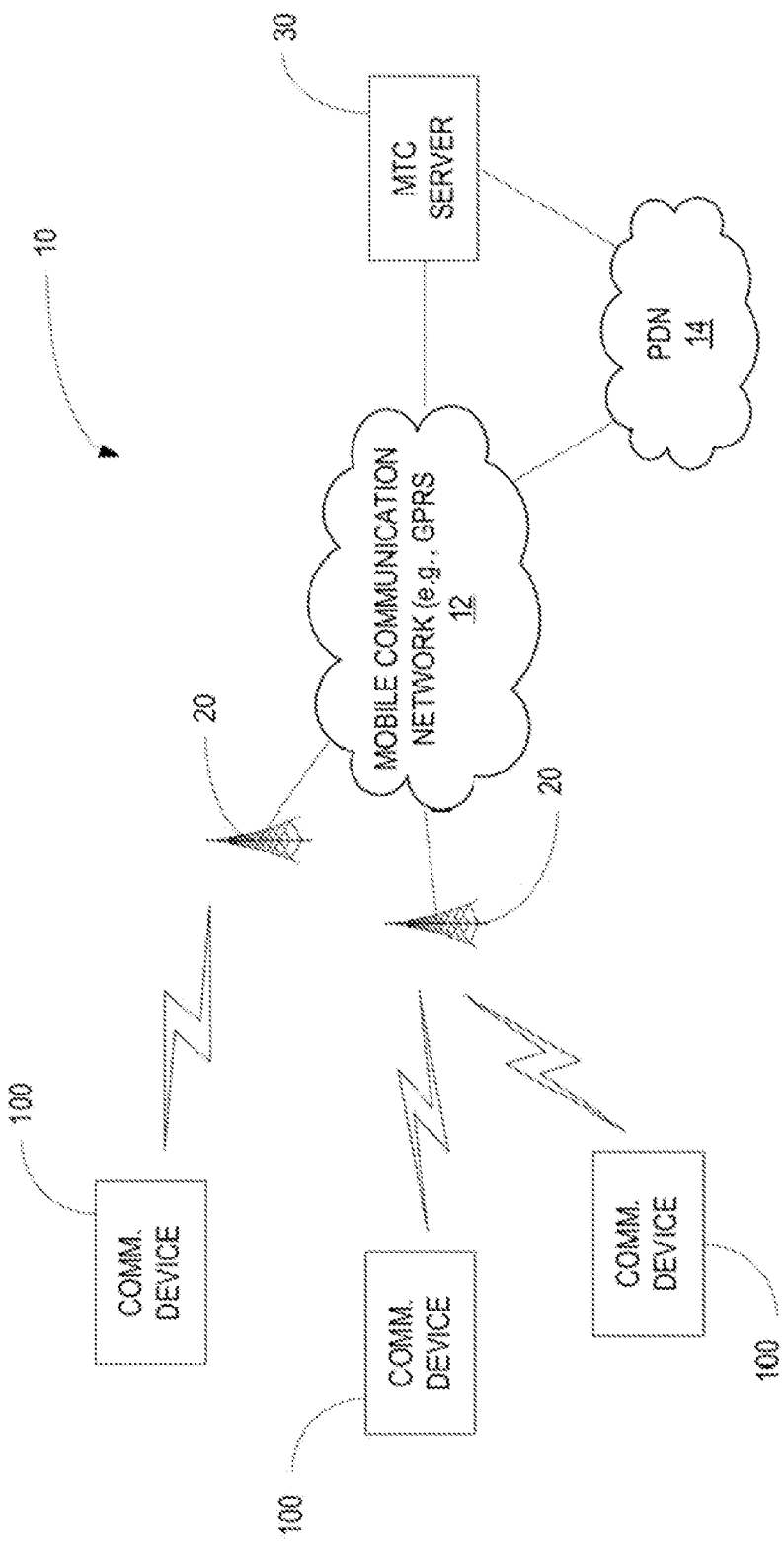
FIG. 1 illustrates an exemplary communication network for communication by MTC devices.

Referring now to the drawings, FIG. 1 illustrates an exemplary wireless communication network 10. The communication network 10 may, for example, comprise a mobile communication network 12 that operates according to any standard that employs a contention-based random access channel (RACH). For illustrative purposes, an exemplary embodiment of the present invention will be described in the context of a network operating according to the GSM/EDGE standard. Those skilled in the art will appreciate, however, that the present invention is more generally applicable to other wireless communication systems, including Wideband Code Division Multiple Access (WCDMA), Long-Term Evolution (LTE), and Worldwide Interoperability for Microwave Access (WiMAX) systems. The mobile communication network 10 comprises a core network 12 that connects to an external packet data network 14, such as the Internet, and a plurality of base stations 20 that provide network access to wireless terminals 100. The wireless terminals 100 may communicate with one or more servers 30 connected to the mobile communication network 10 or packet data network 14.

The wireless terminals 100 may comprise machine-type communication (MTC) devices for collecting and reporting of data over a communication network or non-MTC devices. Machine Type Communications (MTC) has been defined as a specific type of wireless communication network traffic. See, e.g., 3GPP Technical Report 23.888, "System Improvements for Machine-Type Communications," the disclosure of which is incorporated herein by reference in its entirety. One example of an MTC device is a gas or power meter with a wireless transceiver for reporting at predetermined time periods usage of gas or electrical power to an MTC server 30. Non-MTC devices are devices, such as a cell phone, smart phone, laptop computer, etc., used for voice and data communications by human users. An MTC device may comprise a dedicated device specifically for data collection and reporting. In other embodiments, a combined wireless terminal 100 may function part of the time as a MTC device and part of the time as a non-MTC device. The MTC devices collect data and send the collected data to an MTC server 30, which may connect directly to the mobile communication network 12 or to the PDN 14.

In order to send the data, a wireless terminal 100 must first establish a connection with the communication network 10. Typically, the wireless terminal 100 registers with the communication network 10 on power up. After registering with the network 10, the wireless terminal 100 may enter an IDLE mode. In the IDLE mode, the wireless terminal 100 does not have an established connection with a base station 20. When the wireless terminal 100 has data to send, it uses a random access procedure to establish a connection with the base station 20 to transmit the data. After the data is transmitted, the wireless terminal 100 may terminate the connection with the base station 20 and return to an IDLE mode. In most typical applications, the wireless terminal 100 will remain attached with the network 10. However, the wireless terminal 100 could detach from the network 10 after sending the data.

Currently, both MTC devices and non-MTC devices all use the same RACH resources. Thus, MTC devices and non-MTC devices must contend with one another for access on the RACH. Due to the rapid growth of MTC devices, it is expected that the number of MTC devices will far exceed the number of non-MTC devices in the near future. To avoid overload and congestion of the RACH, the service providers will require a greater degree of control over network access by MTC devices.

MTC devices are likely to be configured (e.g., pre-programmed) with a profile identifying service-related attributes that correspond to each particular type of device and/or the applications supported by the device. Some of these attributes will be selected from a set of ubiquitous service-related attributes that identify broad types of devices and/or applications. For instance, these attributes might indicate that an application or device is delay tolerant, has low mobility, or has only small data transmission requirements. Given that MTC devices will have a specific profile of MTC service attributes, the radio access network (RAN) can apply an access control mechanism indicating that system accesses are barred for MTC devices having one or more of these service attributes enabled.

Applying an access control mechanism may be necessary during periods of heavy access load, so as to throttle the number of MTC devices that actually attempt system access during this time period. In other words, this access control mechanism effectively provides operators with the ability to bar system access attempts from MTC devices possessing different service attribute profiles. The ability to distinguish between devices having different service attributes permits the operator to regulate access attempts with an operator-determined granularity (i.e., from 0% to 100%), and for operator-determined time intervals.

Figure 2:
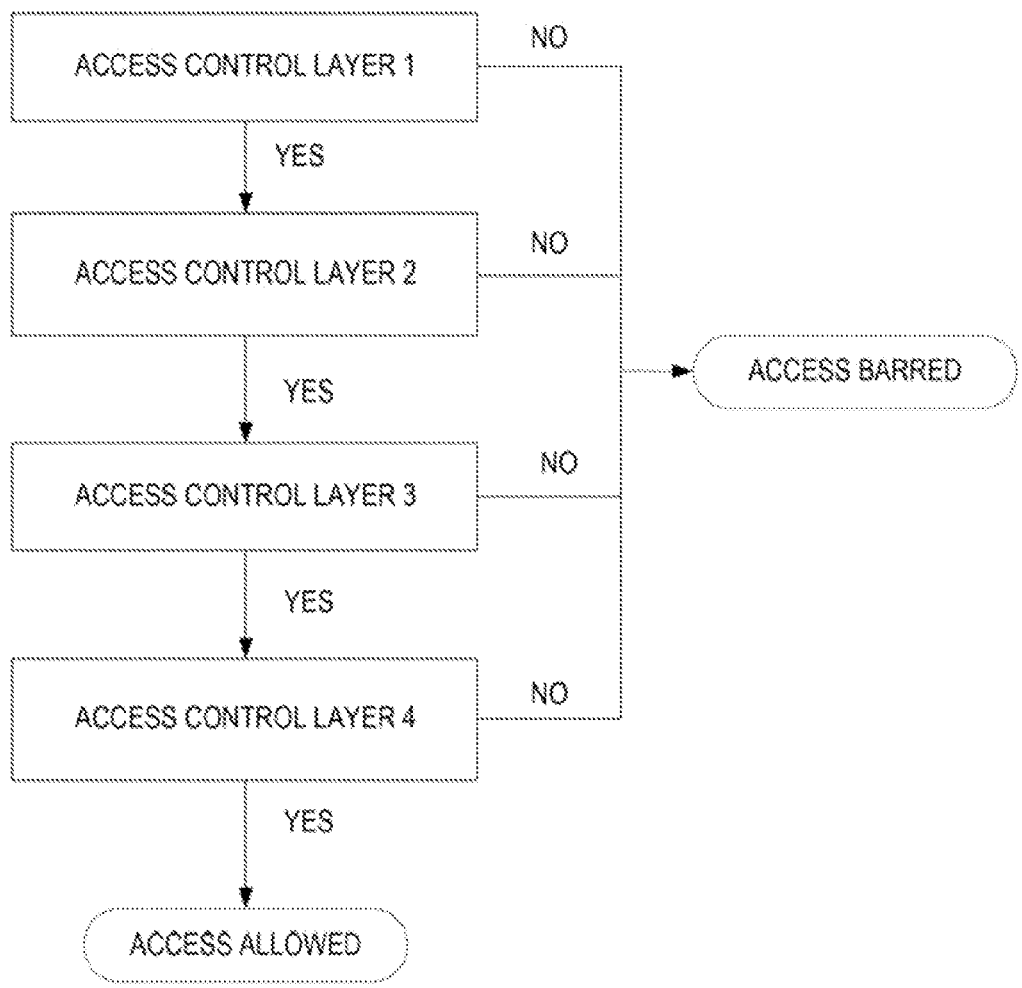
FIG. 2 illustrates a layered access control scheme for MTC devices.

According to one embodiment of the present invention, a layered access control scheme is used to provide a high degree of control over network access attempts by MTC devices. FIG. 2 illustrates schematically a layered access control scheme according to one embodiment of the present invention. The access control rules are contained in distinct access control layers. Each access control layer comprises one or more sets of access control rules, which may apply to different types of MTC applications. When an MTC device attempts to access the network, the access control rules are applied in order by layer. That is, the access control rules for access control layer 1 are applied first, followed by the access control rules for access control layer 2, and so forth. To gain access to the network 100, the MTC device must not be barred by any access control layer. In other words, the access control rules in any one layer may bar access. As will be hereinafter described in greater detail, the access control layers can be selectively enabled and disabled to provide a high degree of control over network access by MTC devices. When an access control layer is enabled, the corresponding access control rules are applied. Conversely, when the access control layer is disabled, the access control rules corresponding to that layer are disregarded. The layered access control scheme may be applied to access attempts by both user plane applications and control plane applications on MTC devices.

Table 1 below illustrates an exemplary access control approach according to one embodiment of the invention using four access control layers.

TABLE 1

Attributes for Layered Access Control Approach

| Access Control Layer | User Plane Applications | Control Plane Applications |
|---|---|---|
| 1 | Priority Level Transmission Interval | Mobility Visibility |
| 2 | Roaming Status | Roaming Status |
| 3 | Access Type | Access Type |
| 4 | Access Classes | Access Classes |

Within each layer, access control rules are based on certain device-specific and/or application—specific attributes. Different attributes may be applied for user plane and control plane applications. For example, the embodiments illustrated in Table 1 uses different attributes for user plane and control plane applications in the first access control layer. In other layers, the attributes used for access control may be the same for both user plane and control plane applications. However, it will be appreciated that different rules may still be applied for user plane and control plane applications.

In the exemplary embodiment illustrated by Table 1, access control rules are based on a priority level and transmission time interval attribute for user plane applications in the first access control layer. The priority level attribute indicates the relative importance of the application and the transmission interval attribute indicates the frequency of data transmission by the application. For control plane applications, the access control rules for the first access control layer are based on a mobility attribute indicating the degree of mobility of the MTC device, and a visibility attribute indicating the degree of visibility of the MTC device.

Access attempts that are not barred by the first access control layer are subject to the second layer of access control. In the exemplary embodiment, the second layer of access control is based on the roaming status attribute. The roaming status indicates whether the MTC device or associated access terminal is located in a home network, visited network, or equivalent network.

Access attempts that are not barred by the first and second access control layers are subject to a third layer of access control. In the third access control layer, access control rules are based on an access type attribute indicating whether the MTC device or associated access terminal is attempting system access autonomously or in response to being solicited (i.e., polled or paged).

Access attempts that are allowed by the first three access control layers can be considered by the operator to have equal importance. These equally important access attempts may be subject to a final layer of access control, depending on the load on the RACH. As one example, access class barring rules may be applied to all access attempts allowed by the first three access control layers to limit access to a predetermined percentage of the MTC devices that pass through the first three access control layers. Access class barring is described in a U.S. patent application titled "ACCESS CONTROL FOR MACHINE-TYPE COMMUNICATION DEVICES" which is filed on the same date as this application and identified by attorney docket number 4015-7289. This application is incorporated herein in its entirety by reference.

With the multi-layered access control scheme, network operators are provided with the ability to bar system access by MTC devices with fine granularity. The layered access control scheme also provides the network operator with the ability to determine what types of network accesses are barred at any point in time and the period for which the barring is to be applied. Barring may be applied separately to user plane and control plane applications. The following is a more detailed description of one exemplary access control scheme.

The first layer of access control is based on application attributes for user plane applications. Each user plane MTC application has a corresponding priority level attribute and a transmission interval attribute. The priority level attribute indicates the importance of the MTC application. Each user plane MTC application is assigned a priority level. The priority level may be preprogrammed into the MTC device, or may be assigned by the MTC server 30. For example, the MTC server 30 may assign each MTC application a priority level when an MTC device is activated or when an MTC device registers with the MTC server 30. It should be noted that an MTC device 100 may support multiple MTC applications. Different MTC applications hosted by the same MTC device may have different priority levels. However, in some cases, it may be appropriate to associate a single priority level to all MTC applications on a given MTC device.

Table 2 below provides one example of priority levels according to one embodiment of the invention. In this example, there are four priority levels enumerated 1-4, with 1 being the highest. Priority level 1 is for public safety applications. These applications are real-time applications with a maximum tolerable delay in the order of seconds. Priority levels 2-4 are for other MTC applications and are based on the delay tolerance of the MTC application. Priority level 2 is for minimum delay tolerant MTC applications. These MTC applications are typically real-time applications with a maximum tolerant delay in the order of seconds. Priority level 3 is for medium delay tolerant MTC applications. These applications are typically non-real time and have a maximum tolerant delay in the order of minutes. Priority level 4, the lowest priority level, is for maximum delay tolerant MTC applications. These applications are typically non-real time and have a tolerable delay in the order of hours.

TABLE 2

Priority Level Attribute

| Priority Level Values | Priority Level Categories | Description |
|---|---|---|
| 1 | Public Safety | Real-time, maximum delay in the order of seconds |
| 2 | Minimum Delay Tolerant | Real-time, maximum delay in the order of seconds |
| 3 | Medium Delay Tolerant | Real-time, maximum delay in the order of minutes |
| 4 | Maximum Delay Tolerant | Real-time, maximum delay in the order of hours |

The four priority levels described above can be common to all networks such that each MTC application must be assigned one of these four priority levels before it can access the network 10 to send or receive application data. The base station 20 can selectively bar access attempts by MTC devices based on the priority level of the application attempting to send data. As an example, the base station 20 could permit access attempts by MTC devices for applications with priority levels 1 and 2, while barring access attempts by MTC devices for applications with priority levels 3 and 4. For each priority level, the base station 20 may send an access control bit in system information to the MTC device or associated access terminal. The access control bit may be set to a value of "0" to permit access and to a value of "1" to bar access.

Each MTC application may also be assigned a transmission interval attribute. The transmission interval attribute indicates the frequency of transmissions triggered by the application. In one exemplary embodiment, three different transmission intervals denoted as "high," "medium," and "low" are defined as shown in Table 3. The high transmission interval is for MTC applications that transmit frequently in the order of seconds. The medium transmission interval is for MTC applications whose transmissions are spaced in the order of minutes. The low transmission interval is for MTC applications whose transmissions are spaced in the order of hours.

TABLE 3

Transmission Interval Attribute

| Transmission Interval Categories | Description |
| --- | --- |
| High | Frequent transmissions in the order of seconds |
| Medium | Frequent transmissions in the order of minutes |
| Low | Infrequent transmissions in the order of hours |

As with the priority level attribute, the network operator may require each MTC application to be assigned a transmission interval attribute before the MTC application is allowed to send application data. The base station 20 can therefore selectively bar access attempts by MTC devices based on the transmission interval attribute. For example, the base station 20 could allow access attempts by MTC devices for applications with high or medium transmission intervals, while barring access attempts by MTC devices for applications with a low transmission interval. An access control bit can be associated with each transmission interval category and transmitted to the MTC device or associated access terminal along with other system information.

For control plane applications, such as non-access stratum (NAS) signaling applications on MTC devices, a different set of access control rules may be applied by the first access control layer. The MTC device may, for example, need to perform periodic NAS signaling with a serving GSM/EDGE support node (SGSN), mobile switching center (MSC), or MTC server 30. The NAS signaling may be used for establishing, terminating, and maintaining communication sessions, or to update the location of the MTC device. Different types of MTC devices will generate different amounts of NAS signaling by the control plane applications within the MTC device or associated access terminal.

In the exemplary embodiment, two attributes are defined for controlling access by control pane applications. More particularly, the exemplary embodiment defines a mobility attribute and a visibility attribute. The mobility attribute indicates the amount of roaming that is expected by the MTC device. MTC devices that are expected to experience frequent roaming will generate greater NAS signaling mode by control plane applications than MTC devices that are expected to roam infrequently. For example, an MTC device that is disposed in a vehicle may be expected to change location frequently. On the other hand, some MTC devices may change location only infrequently (e.g., when the MTC device is redeployed). The visibility attribute indicates whether the attachment to the network by the MTC device or associated access terminal is persistent. An MTC device that remains attached indefinitely will have high visibility, while an MTC device that attaches only when necessary to send messages and detaches when message are sent will have low visibility. Applications on low visibility MTC devices will typically generate a significant amount of NAS signaling (e.g., GSM/EDGE attach signaling), depending on how often the MTC devices need to send or receive data.

The mobility and visibility attributes indicate the amount of overhead that is expected to be generated by a control plane application in an MTC device or associated access terminal. The base station 20 may selectively bar access attempts based on the mobility and/or visibility attributes. For example, a network operator may decide to limit access attempts by control plane applications on high mobility and/or low visibility MTC devices in order to limit the overhead generated by such applications.

Table 4 provides one example of access control rules based on mobility and/or visibility attributes according to one embodiment. As shown in Table 4, twelve NAS signaling categories are defined based on the mobility and/or visibility attributes. The base station 20 may selectively bar access to the network based on the signaling category by transmitting an access control bit for each signaling category to the MTC device 100.

TABLE 4

| NAS Signaling Categories | Signaling Type | Mobility/Visibility attribute |
| --- | --- | --- |
| 1 | PS Domain attach signaling | Low Visibility |
| 2 | PS Domain attach signaling | High Visibility |
| 3 | CS Domain attach signaling | Low Visibility |
| 4 | CS Domain attach signaling | High Visibility |
| 5 | Routing Area update signaling | Low Mobility |
| 6 | Routing Area update signaling | High Mobility |
| 7 | Location Area update signaling | Low Mobility |
| 8 | Location Area update signaling | High Mobility |
| 9 | MTC server signaling | Low Mobility |
| 10 | MTC server signaling | High Mobility |
| 11 | MTC server signaling | Low Visibility |
| 12 | MTC server signaling | High Visibility |

The second layer of access control is based on a roaming status attribute that indicates whether the MTC device is currently within a home network, visited network, or equivalent network. The base station 20 can selectively bar access, depending on the roaming status attribute. A separate access control bit may be associated with each possible roaming status and transmitted to the MTC device with system information. In some embodiments, a single access control bit for each possible roaming status may be used for both MTC user plane applications and control plane applications. In other embodiments, a separate access control bit for each possible roaming status may be used to independently control access for purposes of sending user plane application data and control plane application data.

The third access control layer includes access control rules for barring access based on an access type attribute. The access type attribute indicates whether the access attempt is autonomous or is solicited in response to a previous message from the MTC server 30 or network 12. The base station 20 can selectively bar access attempts by MTC devices depending on the whether the access attempt is autonomous or solicited. As the system loading increases, the base station 20 may, for example, bar autonomous system accesses by the MTC devices while allowing solicited system access. When system loading is low, the base station 20 may allow both autonomous and solicited access attempts. Two access control bits may be transmitted by the base station 20, along with system information to selectively bar access based on whether the access attempt is autonomous or solicited: one bit to control autonomous access attempts and one bit to control solicited access attempts. In some embodiments, the same access control bits may be used for both MTC user plane applications and control plane applications. In other embodiments, separate access control bits may be used to independently control access for user plane and control plane applications.

In the exemplary embodiment, access attempts that are allowed by the first three layers of access control can be considered to be of equal importance to the network operator. The fourth and final layer of access control layer according to the exemplary embodiment provides the network operator the ability to permit or bar a variable percentage of access attempts of these equally important network accesses. As one example, each MTC device or associated access terminal may be assigned to an access class. In one exemplary embodiment, ten access classes enumerated 0-9 are defined. The assignment of an MTC device to an access class is based on the last digit of the device identity, such as the International Mobile Subscriber Identity (IMSI). This approach divides the MTC devices into ten substantially equal size access classes. An access control bit is associated with each access class. Thus, the base station 20 can control the number of access attempts by selectively barring one or more access classes. To be fair, a rotating mask may be used to bar access by devices or terminals associated with one or more access classes so that MTC devices in all access classes have equal opportunity to access the network 10.

In some embodiments of the invention, the access control layers can be selectively enabled and disabled by the base station 20, depending on a type of application attempting to access the network 10. When an access control layer is enabled, the access control rules for the access control layer are applied. Conversely, when a layer is disabled, the access control rules are not applied. In some embodiments of the invention, an enablement signal may be used to selectively enable and disable specific rule sets within a layer. For example, a first enablement signal may be used to selectively enable the rule set in the first access control layer based on the priority level attribute, and a second enablement signal may be used to selectively enable the rule set in the first access control layer based on the transmission interval attribute. Table 5 below shows one example of the selective enablement of access control layers for user plane application data.

TABLE 5

Example of Selective Enablement of Access
Control Layers for User Plane Messages

| MTC Application | Access Control | | | |
| --- | --- | --- | --- | --- |
| | FLAA (priority level attribute) | FLAA (transmission interval attribute) | SLAA | TLAA |
| Public Safety Application | Applicable | Not Applicable | Not Applicable | Not Applicable |
| MTC Application (real time) | Applicable | Applicable | Applicable | Not Applicable |
| MTC Application (non-real time) | Applicable | Applicable | Applicable | Applicable |

FLAA = First Level Access Attribute
SLAA = Second Level Access Attribute
TLAA = Third Level Access Attribute In this example, three application types are defined: public safety application, real time MTC application, and non-real time MTC application. For each application type, a 4-bit enablement signal is used to enable/disable the layers and/or rule sets in a layer. The first two bits selectively enable the priority level rule set and the transmission interval rule set in the first access control layer. The third and fourth bits selectively enable the second and third access control layers, respectively. The base station 20 can transmit the enablement signal to the MTC device or associated MTC device 100 along with system information to selectively enable the access control layers and/or rule sets for MTC applications.

Table 6 below illustrates an exemplary method for selectively enabling access control layers for control plane applications.

TABLE 6

Example of Selective Enablement of Access
Control Layers for Control Plane Messages

| | Access Control | | |
| --- | --- | --- | --- |
| NAS Signalling | FLAA (mobility attribute) | SLAA | TLAA |
| SGSN signaling | Applicable | Applicable | Not Applicable |
| MSC signaling | Applicable | Applicable | Not Applicable |
| MTC server signaling | Applicable | Applicable | Applicable |

FLAA = First Level Access Attribute
SLAA = Second Level Access Attribute
TLAA = Third Level Access Attribute In this example, three types of control plane applications are defined: SGSN signaling, MSC signaling, and MTC server signaling. For each application type, a 3-bit enablement signal is used to selectively enable the first, second, and third access control layers, respectively.

It should be noted that in the example described, the fourth access control layer is applied to all applications. It will be appreciated, however, that the fourth access control layer could also be selectively enabled and disabled as previously described.

The access control scheme as previously described can be used by a base station 20 to limit access to the network, depending on the load as seen by the base station 20. Additionally, the Serving GSM/EDGE Support Node (SGSN) in the core network 12 may indicate to the base station 20 its loading status. In one exemplary embodiment, the base station 20 may consider the load status indication from the SGSN for access control. The base station 20 may thus limit access based on loading at either the base station 20, the SGSN, or both. As one example, NAS signaling can be restricted based on an indication from the SGSN that the processing load is high. A load status indication from the SGSN may thus be used to influence the access control implemented by the base station 20.

Figure 4:
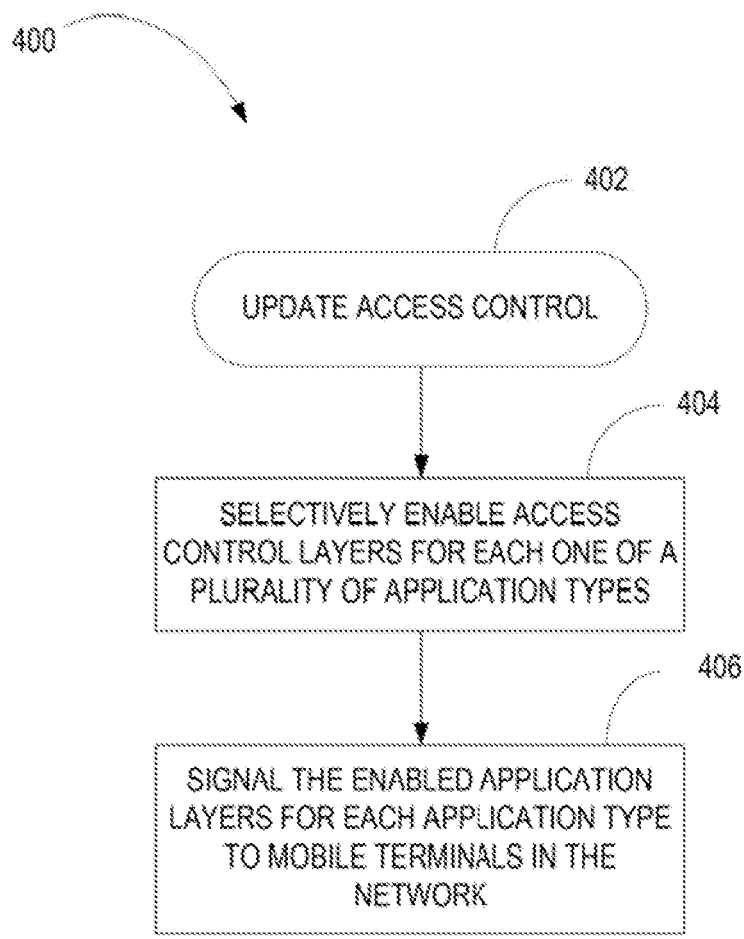
FIG. 4 illustrates an exemplary access control procedure implemented by a base station.

FIG. 4 illustrates an exemplary access control procedure 300 implemented by a base station 20. The procedure 400 begins when an access control update is triggered (block 402). The base station 20 may be configured to update the access control rules at predetermined time intervals or time of day, or in response to predetermined events. For example, the update procedure may be triggered at a periodic time interval or in response to changes in the load at the base station 20 and/or SGSN.

When the update is triggered (block 402), the base station 20 selectively enables the access control layers for each one of a plurality of different application types (block 404). As previously noted, the base station 20 may enable a different set of layers for different application types. The base station 20 then signals the enabled access control layers for each application type to the MTC devices or associated access terminals (block 406). In some embodiments, the base station 20 may set the access control rules for each of the enabled access control layers. As an example, if the first access control layer is enabled, the base station 20 may set the access control bits for each priority level and/or transmission interval. The base station 20 then signals the access control rules for each access control layer that is enabled. By selectively enabling different access control layers for different application types, the base station 20 can more effectively manage the load on the base station 20 and/or SGSN generated by MTC devices generated by different types of MTC applications. Each access control layer also provides rules for restricting access.

Figure 3:
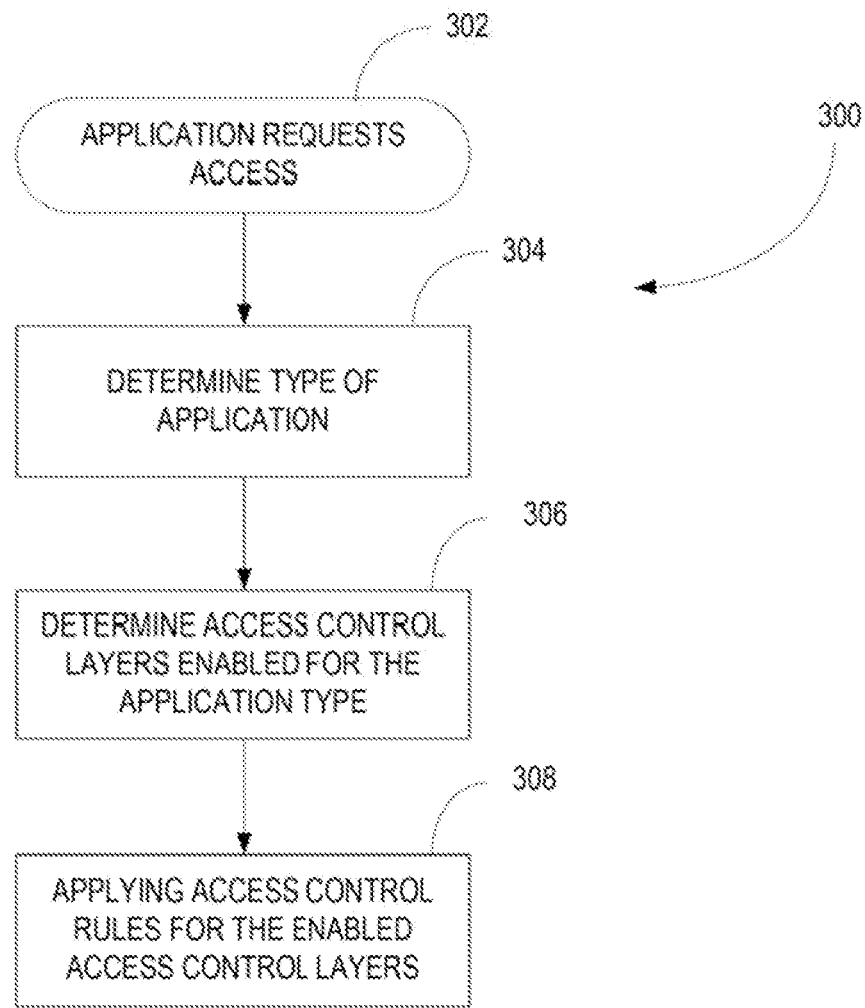
FIG. 3 illustrates an exemplary method of access control implemented by an MTC device.

FIG. 3 illustrates an exemplary access control procedure 300 implemented by an access control function in an MTC device 100. The procedure begins when an application requests access to send data (block 302). The application may comprise a user plane or a control plane application. When an application requests network access, the access control function in the MTC device 100 determines the application type of the application requesting network access (block 304), and determines the access control layers enabled for the application type (block 306). The access control function then applies the access control rules for the enabled access control layers (block 308). As previously described, network access is permitted only if the access is allowed by all enabled access control layers. If any single access control layer bars access, then access is prohibited.

Figure 5:
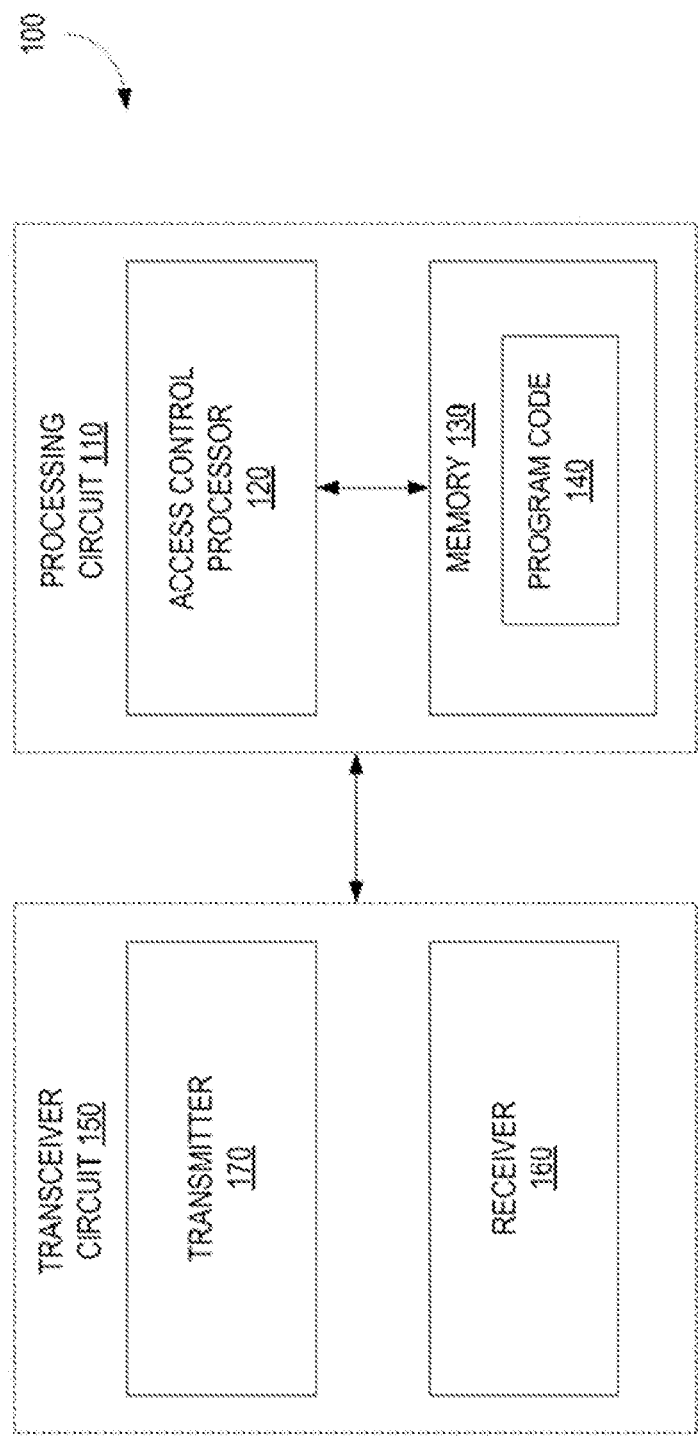
FIG. 5 illustrates an MTC device implementing a layered access control scheme.

FIG. 5 illustrates an exemplary wireless terminal 100 that may function as an MTC device, non-MTC device, or both. The wireless terminal 100 includes a processing circuit 110 connected to a transceiver circuit 150 that communicates with base stations 20 in the mobile communication network 10. The processing circuit 110 includes an access control processor 120 and memory 130 for storing program code 140 controlling operation of the wireless terminal 100. The program code 140 includes code for performing the access control functions as herein described. The transceiver circuit 150 comprises a receiver 160 and transmitter 170 for communicating with the base station 20. The transceiver circuit 150 may operate, for example, according to the GSM/EDGE standard or other communication standard.

Figure 6:
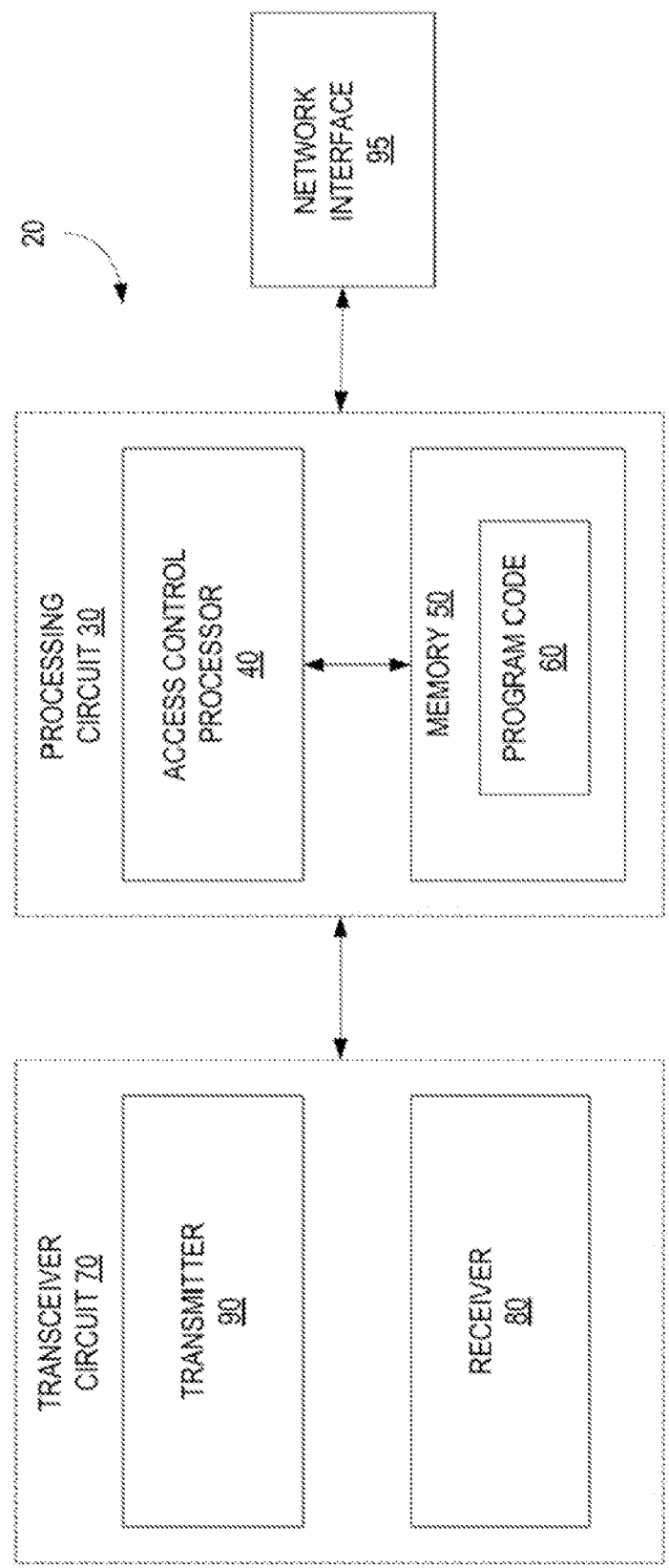
FIG. 6 illustrates an exemplary base station implementing a layered access control scheme.

FIG. 6 illustrates an exemplary base station 20 that implements the access control functions as herein described. The base station 20 includes a processing circuit 30 connected to a wireless transceiver circuit 50 that communicates with wireless terminals 100 in the mobile communication network 10, and a network interface 95. The processing circuit 30 includes an access control processor 40 and memory 50 for storing program code 60 controlling operation of the base station 20. The program code 60 includes code for performing the access control functions as herein described. The transceiver circuit 70 comprises a receiver 80 and transmitter 90 for communicating with the base station 20. The transceiver circuit 70 may operate, for example, according to the GSM/EDGE standard or other communication standard. The network interface 95 enables the base station 20 to communicate with other base stations 20 and network nodes within the core network 12.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An access control method implemented by a wireless terminal in a mobile communication network, said method comprising:
   determining an application type for an application that is attempting to access said communication network;
   determining two or more access control layers from a set of access control layers enabled for the application type; and,
   applying access control rules for the enabled access control layers to control access to the network by the application, including:
      applying access control rules for each enabled access control layer beginning with a first layer, and
      applying access control rules for each subsequent enabled access control layer only if access is not restricted by a preceding enabled access control layer,
   wherein system access is attempted only if access is not restricted by any of the two or more enabled access control layers.

2. The method of claim 1, wherein a first access control layer comprises access control rules based on one or more application attributes.

3. The method of claim 2, wherein applying access control rules for the enabled access control layers comprises determining one or more application attributes for the application and controlling access based on the application attributes when the first access control layer is enabled.

4. The method of claim 2, wherein the first enabled access control layer comprises a first set of access control rules based on first application attributes for user plane applications and a second set of access control rules based on second application attributes for control plane applications.

5. The method of claim 4, wherein the application attributes for user plane applications include at least one of a priority level attribute and a transmission interval attribute.

6. The method of claim 4, wherein the application attributes for control plane applications include at least one of a mobility attribute and a visibility attribute.

7. The method of claim 1, wherein a second enabled access control layer comprises access control rules for controlling access based on a roaming status attribute.

8. The method of claim 1, wherein a third enabled access control layer comprises access control rules for controlling access based on an access type attribute.

9. The method of claim 1, wherein a final one of said enabled access control layers comprises access control rules for controlling access based on an access class of said wireless terminal.

10. The method of claim 9, wherein controlling access based on the access class of the wireless terminal comprises:
    determining an access class for the wireless terminal;
    determining an applicable access control mask, said access control mask comprising a plurality of access control bits indicating whether respective access classes are allowed to access the communication network; and,
    controlling access to the network based on the determined access class and the applicable access control mask.

11. A wireless terminal in a mobile communication network, said wireless terminal comprising:
    a transceiver for communicating with a base station in a communication network;
    a control unit connected to the transceiver for controlling access to the communication network by an application attempting to access the communication network, said control unit including a processor configured to:
    determine an application type for the application;

determine two or more access control layers from a set of access control layers enabled for the application type; and, apply access control rules for the enabled access control layers to control access to the network by the application, including:

applying access control rules for each enabled access control layer in order beginning with a first layer; and, applying access control rules for each subsequent enabled access control layer only if access is not restricted by a preceding enabled access control layer, wherein system access is attempted only if access is not restricted by any of the two or more enabled access control layers.

12. The wireless terminal of claim 11, wherein the first access control layer comprises access control rules based on one or more application attributes and wherein the processor is configured to control access based on said application attributes when said first access control layer is enabled.

13. The wireless terminal of claim 12, wherein the processor is configured to determine one or more application attributes for the application, and control access based on the application attributes when the first access control layer is enabled.

14. The wireless terminal of claim 12, wherein the processor is configured to apply a first set of access control rules based on first application attributes for user plane applications and a second set of access control rules based on second application attributes for control plane applications.

15. The wireless terminal of claim 14, wherein the application attributes for user plane applications include at least one of a priority level attribute and a transmission interval attribute, and wherein the processor is configured to control access for user plane applications based on at least one of said priority level attribute and said transmission interval attribute.

16. The wireless terminal of claim 14, wherein the application attributes for control plane applications include at least one of a mobility attribute and a visibility attribute, and wherein the processor is configured to control access for control plane applications based on at least one of said mobility attribute and said visibility attribute.

17. The wireless terminal of claim 11, wherein a second enabled access control layer comprises access control rules for controlling access based on roaming status attributes and wherein said processor is configured to control access based on said roaming status attributes in said second enabled access control layer.

18. The wireless terminal of claim 11, wherein a third enabled access control layer comprises access control rules for controlling access based on an access type attribute and wherein said processor is configured to control access based on said access type attribute in said third enabled access control layer.

19. The wireless terminal of claim 11, wherein a final one of said enabled access control layers comprises access control rules for controlling access based on an access class of said wireless terminal and wherein the processor is configured to control access based on the access class of the wireless terminal in said final enabled access control layer.

20. The wireless terminal of claim 19, wherein the processor controls access based on the access class of the wireless terminal by:

determining an access class for the wireless terminal;

determining an applicable access control mask, said access control mask comprising a plurality of access control bits indicating whether respective access classes are allowed to access the communication network; and, controlling access to the network based on the determined access class and the applicable access control mask.

* * * * *